(12) United States Patent
Aviani et al.

(10) Patent No.: US 7,574,741 B2
(45) Date of Patent: Aug. 11, 2009

(54) METHOD AND SYSTEM FOR PREVENTING OPERATING SYSTEM DETECTION

(75) Inventors: James Aviani, Santa Barbara, CA (US); Jean-Philippe Champagne, Goleta, CA (US); Matthew Gnagy, Milpitas, CA (US); Michael Hall, Austin, TX (US); Ravishankar Ganesh Ithal, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 839 days.

(21) Appl. No.: 11/110,144

(22) Filed: Apr. 20, 2005

(65) Prior Publication Data

US 2006/0242704 A1 Oct. 26, 2006

(51) Int. Cl.
*G06F 17/30* (2006.01)
*H04L 9/00* (2006.01)
(52) U.S. Cl. .............................. 726/23; 726/22; 726/26
(58) Field of Classification Search .................. 726/23, 726/22, 26
See application file for complete search history.

(56) References Cited

U.S. PATENT DOCUMENTS

2003/0065945 A1  4/2003  Lingafelt et al.

OTHER PUBLICATIONS

Returning Fire with Ice, Tere Parnell, Network World, Oct. 4, 1999, year 1999.*
Honeypot (Computing), Wikipedia, printed out in year 2008.*
Network Security, Wikipedia, printed out in year 2008.*
Antivirus Software, Wikipedia, printed out in year 2008.*
A peer-based hardware protocol for intrusion detection systems White, G.B.; Huson, M.L.; Military Communications Conference, 1996. Milcom '96, Conference Proceedings, IEEE vol. 2, Oct. 21-24, 1996 pp. 468-472 vol. 2.*
Evaluation of a Decentralized Architecture for Large Scale Collaborative Intrusion Detection Zhou, C.V.; Karunasekera, S.; Leckie, C.; Integrated Network Management, 2007. IM '07. 10th IFIP/IEEE International Symposium on May 21, 2007-Yearly 25 2007 pp. 80-89.*
Theoretical basis for intrusion detection Zhuowei Li; Das, A.; Jianying Zhou; Information Assurance Workshop, 2005. IAW '05. Proceedings from the Sixth Annual IEEE SMC Jun. 15-17, 2005 pp. 184-192.*

* cited by examiner

*Primary Examiner*—David Y Jung
(74) *Attorney, Agent, or Firm*—Trellis IP Law Group, PC

(57) ABSTRACT

A method and system for preventing the detection of an operating system by an intruder, the operating system installed on a host in a network, is provided. The intruder transmits a network probe for operating system detection. The network probe is identified and a response is generated to the network probe, generated by the operating system, is modified. The modified response provides the intruder with false information related to the operating system, thereby misleading the intruder about the type of operating system.

30 Claims, 3 Drawing Sheets

METHOD AND SYSTEM FOR PREVENTING OPERATING SYSTEM DETECTION

BACKGROUND OF THE INVENTION

1. Field of Invention

This invention relates in general to network security. More specifically, the invention relates to methods and systems for preventing the detection of an operating system installed in a host on a network.

2. Description of the Background Art

Intruders generally attack operating systems installed in hosts in a network. An intruder can be a host operating in another network, or a software program running on a host operating in another network system. The intruders attack the host by sending viruses, worms, corrupted files, etc., that do not have any authorized access to the host in the network. Generally, intruders try to gain access to the host in the computer network system by detecting the type of operating system installed on the host and then exploiting the operating systems' weaknesses. There are several conventional methods of detecting the type of operating system the host runs on. One such method is sending seemingly innocuous network probes to operating systems in a computer network system. Examples of network probes, commonly used for detecting operating systems, include the FIN probe, the BOGUS/Reserved flag probe, the Transport Control Protocol (TCP) ftp proxy, the TCP SYN, etc. Different operating systems generate different responses to a network probe. The differences in the responses help the intruders to detect the type of operating systems. The responses to the network probes provide information such as TCP timestamp values, the TCP window size, acknowledgement values, initial sequence numbers (ISN), etc., about the operating system. The intruders use this information to attack the operating system. Thus, network probes are precursors to a network attack, specific to the operating system.

There are several ways of preventing the detection of operating systems. Some network probes can be stopped by traditional firewalls. However, some of the network probes cannot be stopped by traditional firewalls, since these network probes are identical to valid network traffic. Intrusion protection systems (IPS) detect the network probes and then block future network probes, which are transmitted from the same source IP address. However, blocking the network probes can indicate the type of IPS used on the network. In addition, some types of probes could be successful before the probes can be blocked or dropped by the IPS.

Another method of preventing operating system detection is by using 'honeypots'. A honeypot is an information system resource, whose value lies in the unauthorized or illicit use of the resource. Hence, any interaction with honeypots indicates unauthorized or malicious activity. Honeypots can only track and capture network probes that directly interact with the honeypots.

DETAILED DESCRIPTION OF THE EMBODIMENTS OF THE INVENTION

Various embodiments of the invention provide a method, a system, an apparatus and a machine-readable medium for preventing the detection of an operating system installed on a host in a network such as a computer network system. The detection of an operating system includes identifying the type of operating system. In addition, the version of the operating system and a patch level (patches applied) of the operation system can be detected. The prevention of operating system detection raises the difficulty in completing a successful attack and can prevent an attack by an intruder. The attack can be in the form of viruses specific to the operating system, corrupted files, buffer overflow or other exploits running against the host's network services, etc. The intruder detects the operating system via network probes. The response of the operating system to a network probe provides information related to the operating system and the computer network system. The intruder uses this information to detect the operating system. The embodiments of the invention prevent the detection of the operating system by modifying the response of the operating system to the network probe, thereby misleading the intruder about the type of operating system.

Figure 1:
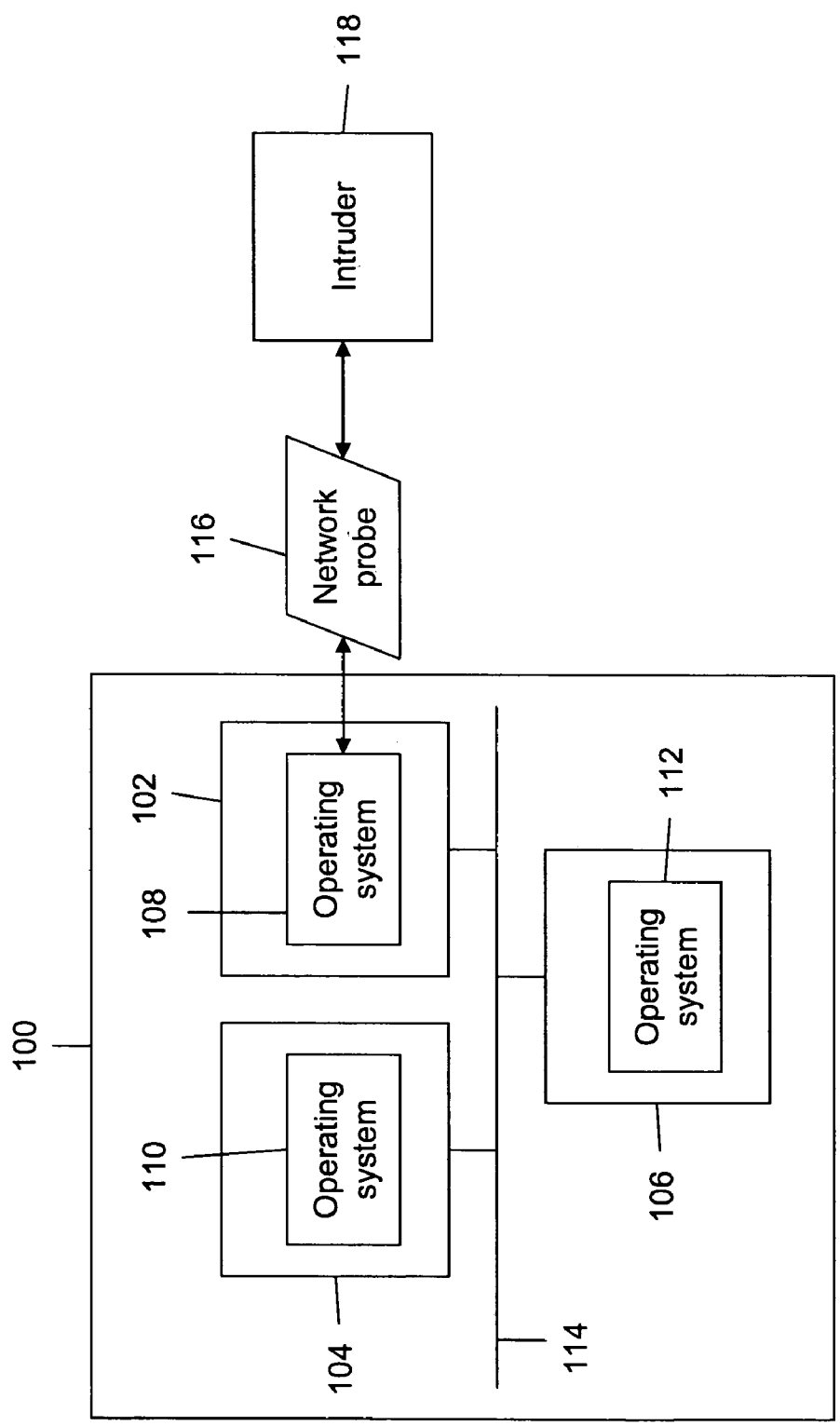
FIG. 1 illustrates a network in which an exemplary embodiment of the present invention can be practiced.

FIG. 1 depicts a representative network 100, in which an exemplary embodiment of the present invention can be practiced. Network 100 includes a plurality of hosts, hereinafter referred to as hosts 102, 104 and 106. Examples of a host include a general-purpose computer, a mainframe computer, a data server, etc. Hosts are connected to each other via a communication link 114. Hosts 102, 104 and 106 can be connected to each other in several ways. For example, hosts 102, 104 and 106 can be connected to each other through a Local Area Network (LAN), a Wide Area Network (WAN), an Internet, etc. Operating systems 108, 110 and 112 are installed on hosts 102, 104 and 106. Operating system 108 transmits information packets to operating systems 110 and 112. Operating system 108 also receives information packets from operating systems 110 and 112.

An operating system is a program that manages the hardware for different applications and executes the applications. The operating system performs tasks such as recognizing input from the keyboard, sending output to the display screen, keeping track of files and directories on the hard disk, and controlling peripheral devices such as disk drivers and printers. Further, the operating system allocates system resources, including memory, processor time, and disk space for different applications. The type of operating system can vary, depending on a particular device, feature, or any other aspect related to a particular application or computer program running on the operating system. Examples of an operating system include, but are not limited to, Linux, Mac OS, Solaris and Windows 95/98/NT/2000/XP.

An intruder 118 transmits network probe 116 to operating system 108 over communication link 114, to detect the type of operating system 108 installed on host 102. Intruder 118 can be a host operating in network 100. In another embodiment of the invention, intruder 118 can be a host operating in another network, or a software program running on a host operating in another network (not shown in the figure). These networks can be connected with each other. They can be connected via a switch, a router and the like. Exemplary network probes include the FIN probe, the BOGUS flag probe, TCP SYN, the TCP ftp proxy, etc. Operating system 108 generates a response corresponding to network probe 116. In various embodiments, the response to network probe 116 provides information about operating system 108. This information helps intruder 118 to detect the type of operating system 108. Depending on the response of operating system 108, or the information collected by network probe 116, intruder 118 attacks operating system 108. The attack includes sending the operating system specific viruses, corrupted files, etc.

Figure 2:
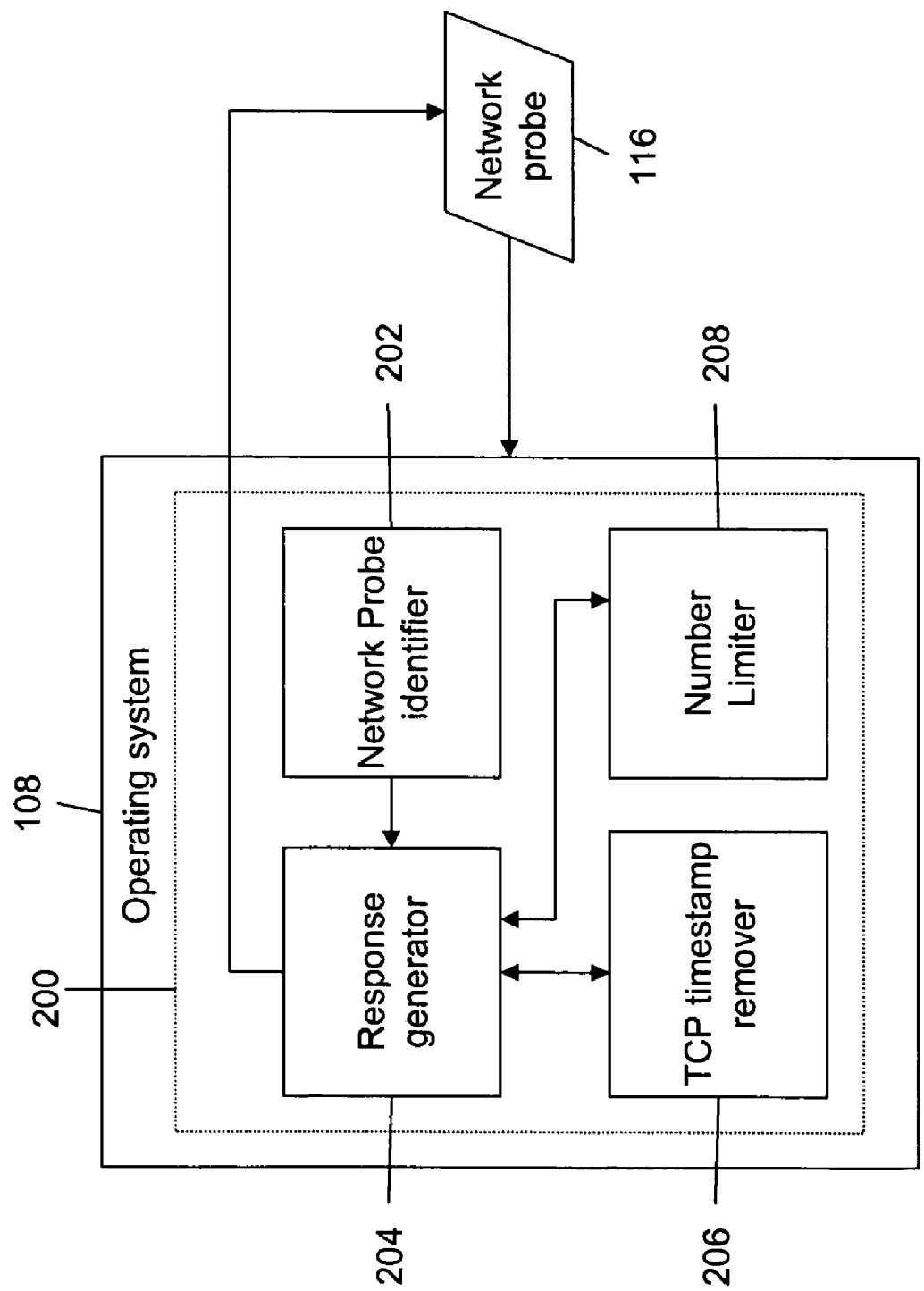
FIG. 2 is a block diagram of a system for preventing operating system detection, in accordance with an exemplary embodiment of the present invention.

FIG. 2 is a block diagram of a system 200, for preventing operating system detection, according to an exemplary embodiment of the present invention. In various embodiments of the invention, system 200 can be a network device that is inline in the communications path between a host and an intruder. In another embodiment of the invention, system 200 can be a part of an operating system System 200 includes a network probe identifier 202 and a response modifier 204. Network probe 116, transmitted by intruder 118, is received by operating system 108 via system 200. Network probe identifier 202 identifies the type of network probe 116 and provides this information to response modifier 204. Depending on the type of network probe 116, response modifier 204 modifies a response generated by operating system 108, thereby providing false information about operating system 108 to intruder 118.

In an embodiment, intruder 118 uses TCP timestamp values from the information packets transmitted by operating system 108, in order to detect the type of operating system 108. In such situations, response modifier 204 removes or modifies the TCP timestamp values from the information packets transmitted by operating system 108. In another embodiment, response modifier 204 limits the number of Internet control messaging protocol (ICMP) error messages in the generated response, thereby providing incomplete information to intruder 118 regarding operating system 108. Hence, the response generated provides false information about operating system 108. The false information makes operating system 108 look like a different operating system. Therefore, intruder 118 cannot detect the type of operating system 108. The various kinds of network probes, and the response provided by response modifier 204, are described in detail later in the description section. In various embodiments of the invention, the elements of system 200 are implemented in the form of software modules.

Figure 3:
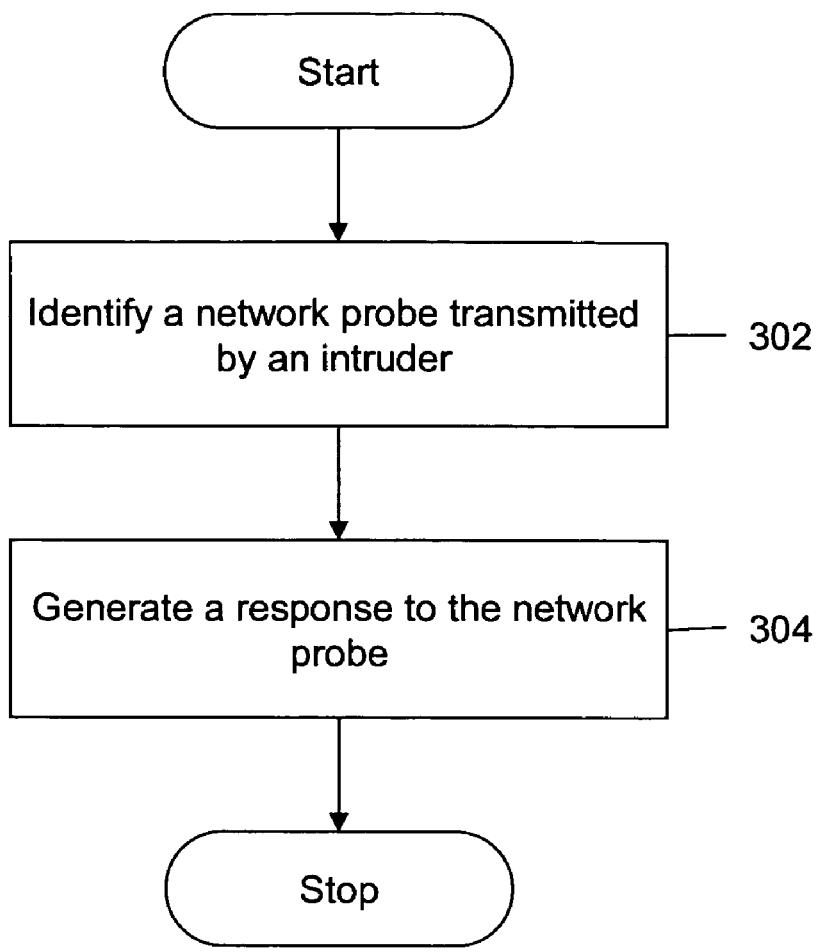
FIG. 3 is a flowchart illustrating a method for preventing operating system detection, in accordance with an exemplary embodiment of the present invention.

FIG. 3 is a flowchart illustrating a method for preventing operating system detection, in accordance with an exemplary embodiment of the present invention. At step 302, network probe transmitted by an intruder is identified. This information is used to determine the type of network probe. At step 304, response of an operating system to the network probe is modified. This modification is specific to the network probe. Due to the modification, the response of the operating system provides false information related to the operating system. In an embodiment of the invention, the false information is provided by adding a code in the appropriate stack level of the operating system 108 for the host 102

Exemplary network probes and the modified responses generated in accordance with step 304, are hereinafter described. It should be understood that these examples are given by way of illustration only and do not limit the spirit and scope of various embodiments of the invention.

If network probe 116 is a FIN probe, operating systems such as Windows, BSDI, CISCO, HP/UX, MVS, and IRIX send back a RESET signal, which is specific to the operating system. Hence, the RESET signal helps the intruder to determine the type of the operating system. To avoid determination of the type of operating system 108, response modifier 204 blocks the FIN probe. Most operating systems also generate a fixed acknowledgement value in response to the FIN probe. The acknowledgement value is specific to the type of operating system. Response modifier 204 randomizes the acknowledgement value, thereby preventing intruder 118 from identifying the type of operating system 108, based on the acknowledgment value.

If the network probe 116 is a BOGUS or reserved flag probe, an unidentified TCP flag is set along with the SYN flag or an invalid combination of flags is used with the BOGUS or reserved flag probe. The reserved TCP flags are set in the seventh or eighth bit of the TCP flag header field. When a SYN flag and one or both of the reserved flags are set, some operating systems reset the connection to other hosts in network 100. In addition, when a bogus flag combination is used, for example SYN|FIN, then some operating systems reset the connection to other hosts in network 100. These responses can enable identification of the type of operating system. Therefore, in an embodiment of the invention, response modifier 204 prevents identification of operating system 108 by removing all the reserved TCP flags from the TCP header on the SYN packets. The removal of the reserved TCP flags ensures that operating system 108 does not reset the connection to other hosts. Also, the system could drop the bogus flag packets, or always send a response that resets the connection but does not identify the operating system.

In some cases, intruder 118 uses TCP timestamp values returned in response to network probe 116 to detect the type of operating system. To avoid detection based on TCP timestamp values, response modifier 204 removes the timestamps from the information packets to be transmitted, thereby modifying the response. In another embodiment, response modifier 204 normalizes the timestamp values to a particular clock rate, in order to generate false timestamp values. This response is then transmitted back to intruder 118. The removal of timestamp values, or the modified time stamp values, ensures that intruder 118 either does not receive any information regarding the operating system, or receives misleading information.

In some cases, network probe 116 uses the 'don't fragment' (DF) bit on the information packets sent by operating system 108. Some operating systems set the DF bit only on certain information packets. This leads to operating system detection. In such cases, response modifier 204 sets the DF bit on all the information packets sent by operating system 108, thereby misleading intruder 118. In another embodiment of the invention, response modifier 204 randomly modifies the DF flags on the information packets sent by operating system 108.

If network probe 116 uses IP identification (IPID) values for operating system 108 detection, response modifier 204 ensures that all the IPID values in the information packets are modified to random values, thereby providing no information regarding the type of operating system. In another embodiment, some operating systems, such as Windows, increment the IPID values of the information packets by 256 for each information packet transmitted. In cases where the operating system of a host is not Windows, response modifier 204 modifies the IPID to use values incremented by 256 for each information packet, thereby confusing intruder 118.

Some operating systems limit the rate at which Internet control messaging protocol (ICMP) error messages are sent along with the information packets transmitted. The number of ICMP error messages sent by operating system 108 in response to network probe 116 is used for the detection of operating system 108. In such cases, response modifier 204 limits the number of ICMP error messages to a pre-defined constant value or a random value thereby providing insufficient information regarding the operating system. In an alternate embodiment, some operating systems, along with the ICMP error messages, send back the required IP header and eight bytes. However, operating systems such as Solaris and Linux send back more than eight bytes with the ICMP error messages. Hence, intruder 118 can easily detect Solaris and Linux. To avoid detection of Solaris and Linux, response modifier 204 limits the number of bytes sent back to eight.

Some network probes use TCP initial sequence numbers (TCP ISN) chosen by operating systems, for detection of operating systems. The TCP ISN values are chosen when the operating systems respond to a connection request from another host in computer network system 100. In the case of such network probes, response modifier 204 randomly chooses the TCP ISN values each time operating system 108 responds to a connection request from another host, thereby misleading intruder 118 regarding the identity of operating system 108. In another embodiment of the invention, the same TCP ISN value is chosen by operating systems 108, 110 and 112, whenever operating systems respond to a connection request from another host, thereby making all operating systems 108, 110 and 112 look alike to intruder 118.

Some operating systems stop accepting new connections from other hosts when many SYN packets are sent to them. For example, some operating systems can handle only eight SYN packets. Hence, intruders can identify the type of operating system by sending eight or more SYN packets to operating system 108, and then try to establish a connection with operating system 108. In order to prevent operating system detection by the method described above, the rate at which SYN packets are exchanged between operating systems is fixed at a pre-defined constant value.

Some operating systems can be uniquely identified by the size of the TCP window on the information packets sent by the operating systems. Hence, intruders detect the type of operating system by sending network probes that collect information related to the size of the TCP window on the information packet. To avoid detection, based on the size of the TCP window, the TCP window size is adjusted to a constant value. For example, the TCP window size can be adjusted to 0x3F25, the window size of an AIX operating system.

In some cases, intruder 118 uses the type of service (TOS) value of the information packet transmitted by operating system 108 for operating system detection. For example, the type of service value used by Linux is 0xC0. In such cases, response modifier 204 makes the type of service value zero for all the packets transmitted by operating system 108, thereby misleading intruder 118.

In some cases, intruder 118 uses TCP options, returned in response to network probe 116, for detecting the type of operating system 108. The various TCP options include window scale, maximum segment size, etc. Operating system 108 can be detected by the values of the TCP options generated. To avoid detection of operating system 108 based on the values of the TCP options, response modifier 204 removes or modifies all the TCP options generated in response to network probe 116. In another embodiment, intruder 118 uses the order of TCP options returned in response to network probe 116, for detecting the type of operating system 108. In order to prevent detection of operating system 108 by the order of TCP options, response modifier 204 maintains a pre-defined order among the TCP options, thereby confusing intruder 118.

The embodiments of the invention have the advantage that modifying the response of the operating system to network probes, or modifying the information packets transmitted by the operating system, helps the operating system to mimic the behavior of another operating system. This wastes the intruder's time. Further, the misrepresentation of the operating system allows the intrusion prevention system (IPS) to detect the type of attack, which can follow the network probe.

Although the invention has been discussed with respect to specific embodiments thereof, these embodiments are merely illustrative, and not restrictive, of the invention. For example, a 'method for preventing operating system detection' can include any type of analysis, manual or automatic, to anticipate the needs of the method.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification may contain material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method for preventing detection of an operating system on a network by an intruder, the operating system installed on a host in a computer network, the method comprising
    receiving, at the host, a network probe from the intruder for detection of the operating system;
    identifying a type of the network probe; and
    generating, by the operating system of the host, a response to the network probe, the response generated based on a type of the operating system;
    modifying, using the host, the response to the network probe generated by the operating system based on the type of the network probe identified, wherein the modified response provides false information related to the operating system such the intruder cannot detect the type of the operating system based on the modified response; and
    sending, using the host, the response to the intruder.

2. The method of claim 1 wherein modifying the response to the network probe further comprises adding a code in an appropriate communication stack level of the host's operating system.

3. The method of claim 1 wherein if the network probe is a FIN probe, modifying the response comprises blocking the network probe.

4. The method of claim 3 further comprising randomizing an acknowledgement value in response to the FIN probe.

5. The method of claim 1 wherein if the network probe is a BOGUS probe, modifying the response comprises removing all flags of the network probe.

6. The method of claim 1 wherein modifying the response comprises removing TCP timestamp values from the generated response if the network probe uses Transport Control Protocol (TCP) timestamp values for the operating system detection.

7. The method of claim 1, wherein modifying the response comprises making all IP identification (IPID) values zero if the network probe uses IPID sampling for the operating system detection.

8. The method of claim 1 wherein modifying the response comprises setting a don't fragment (DF) bit on the generated response if the network probe uses the DF bit for the operating system detection.

9. The method of claim 1 wherein modifying the response comprises limiting the number of Internet control messaging protocol (ICMP) error messages to a predefined value on the generated response if the network probe uses the number of ICMP error messages for the operating system detection.

10. The method of claim 1 wherein modifying the response comprises adjusting the size of a TCP window to a predefined value if the network probe uses the size of TCP window for the operating system detection.

11. The method of claim 1 wherein modifying the response comprises making the Type of Service (TOS) value zero if the network probe uses the TOS value for the operating system detection.

12. The method of claim 1, wherein modifying the response comprises removing all TCP options if the network probe uses the TCP options for the operating system detection.

13. A system for preventing the detection of an operating system on a network by an intruder, the operating system installed on a host in a computer network, the system comprising
- a network probe identifier for receiving, at the host, a network probe from the intruder for detection of the operating system and identifying a type of the network probe;
- an operating system for generating a response to the network probe, the response generated based on a type of the operating system;
- a response modifier for modifying, using the host, the response to the network probe generated by the operating system based on the type of the network probe identified, wherein the modified response provides false information related to the operating system such the intruder cannot detect the type of the operating system based on the modified response; and
- a response sender for sending the response to the intruder.

14. The system of claim 13 wherein the response modifier removes TCP time stamp values from the generated response if the network probe uses TCP timestamp values for operating system detection.

15. The system of claim 14 wherein the response modifier limits the number of ICMP error messages to a pre-defined value on the generated response.

16. The system of claim 13, wherein the response modifier adjusts the size of a TCP window to a predefined value if the network probe uses the size of TCP window for the operating system detection.

17. The system of claim 13, wherein the response modifier makes the Type of Service (TOS) value zero if the network probe uses the TOS value for the operating system detection.

18. The system of claim 13, wherein the response modifier removes all the TCP options if the network probe uses the TCP options for the operating system detection.

19. The system of claim 13, wherein the response modifier blocks the network probe if the network probe is a FIN probe.

20. The system of claim 13, wherein the response modifier removes all the flags of the network probe if the network probe is a BOGUS probe.

21. A system for preventing the detection of an operating system on a network by an intruder, the operating system installed on a host in a computer network, the system comprising
- means for receiving, at the host, a network probe from the intruder for detection of the operating system;
- means for identifying a type of the network probe; and
- means for for generating, by the operating system of the host, a response to the network probe, the response generated based on a type of the operating system;
- means for modifying, using the host, the response to the network probe generated by the operating system based on the type of the network probe identified, wherein the modified response provides false information related to the operating system such the intruder cannot detect the type of the operating system based on the modified response; and
- means for for sending, using the host, the response to the intruder.

22. The system of claim 21 wherein the means for modifying the response removes TCP timestamp values from the generated response to the network probe.

23. The system of claim 21 wherein the means for modifying the response limits the number of ICMP error messages to a pre-defined value on the generated response.

24. The system of claim 21, wherein the means for modifying the response adjusts the size of a TCP window to a predefined value if the network probe uses the size of TCP window for the operating system detection.

25. The system of claim 21, wherein the means for modifying the response makes the Type of Service (TOS) value zero if the network probe uses the TOS value for the operating system detection.

26. The system of claim 21, wherein the means for modifying the response removes all the TCP options if the network probe uses the TCP options for the operating system detection.

27. The system of claim 21, wherein the means for modifying the response blocks the network probe if the network probe is a FIN probe.

28. The system of claim 21, wherein the means for modifying the response removes all the flags of the network probe if the network probe is a BOGUS probe.

29. An apparatus for preventing the detection of an operating system on a network by an intruder, the operating system installed on a host in a computer network, the apparatus comprising
- a processing system including a processor coupled to a display and user input device;
- a machine-readable medium including instructions executable by the processor comprising
- one or more instructions for receiving, at the host, a network probe from the intruder for detection of the operating system;
- one or more instructions for identifying a type of the network probe; and
- one or more instructions for generating, by the operating system of the host, a response to the network probe, the response generated based on a type of the operating system;
- one or more instructions for modifying, using the host, the response to the network probe generated by the operating system based on the type of the network probe identified, wherein the modified response provides false information related to the operating system such the intruder cannot detect the type of the operating system based on the modified response; and
- one or more instructions for sending, using the host, the response to the intruder.

30. A machine-readable medium including instructions executable by the processor for preventing the detection of an operating system on a network by an intruder, the operating system installed on a host in a computer network, the machine-readable medium comprising one or more instructions for receiving, at the host, a network probe from the intruder for detection of the operating system;

one or more instructions for identifying a type of the network probe; and one or more instructions for generating, by the operating system of the host, a response to the network probe, the response generated based on a type of the operating system;

one or more instructions for modifying, using the host, the response to the network probe generated by the operating system based on the type of the network probe identified, wherein the modified response provides false information related to the operating system such the intruder cannot detect the type of the operating system based on the modified response; and one or more instructions for sending, using the host, the response to the intruder.

* * * * *